July 5, 1960

I. M. BLOOMFIELD 2,943,542

ROLL FILM ADAPTER

Filed May 14, 1956

Inventor
Irwin M. Bloomfield
By Wallenstein + Spangenberg Attys

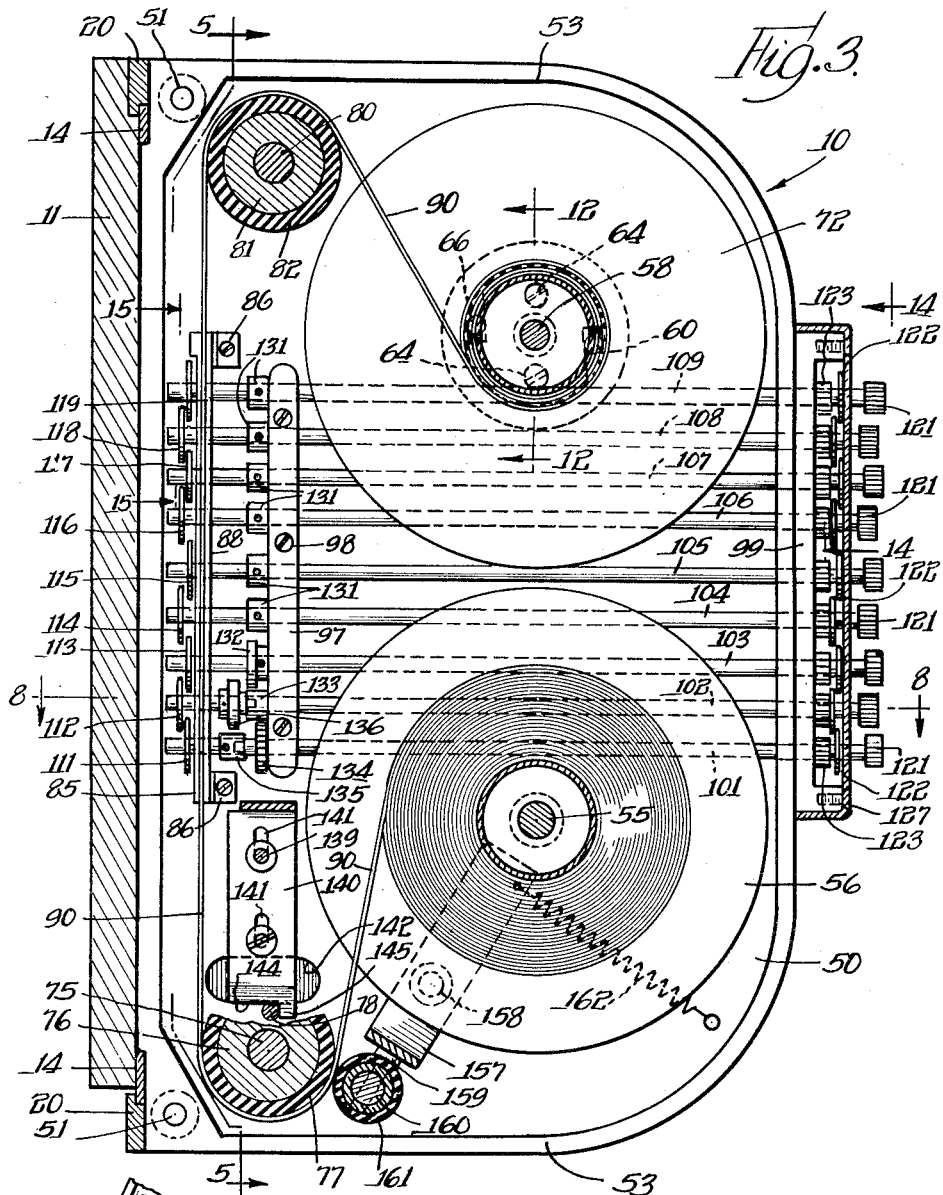

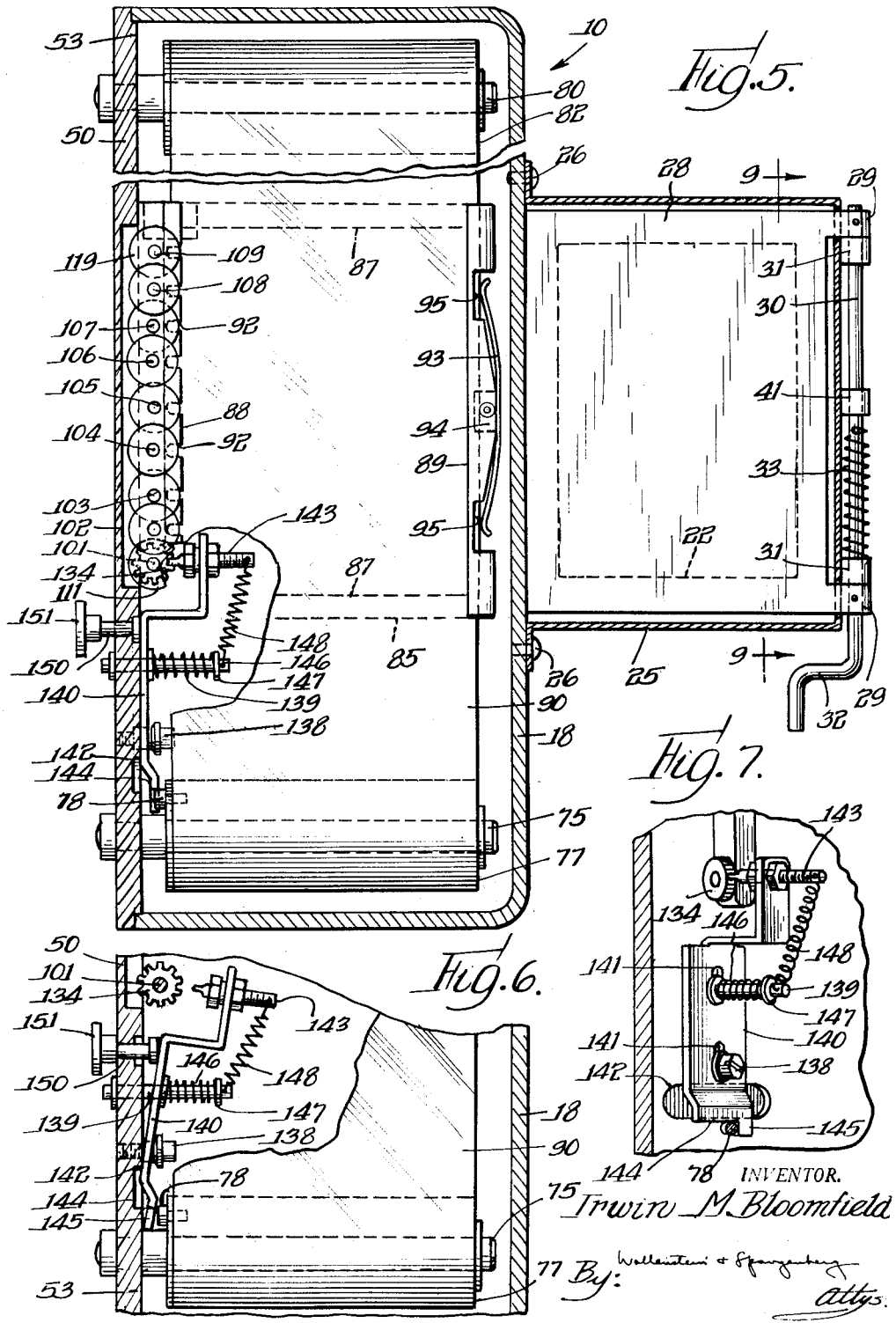

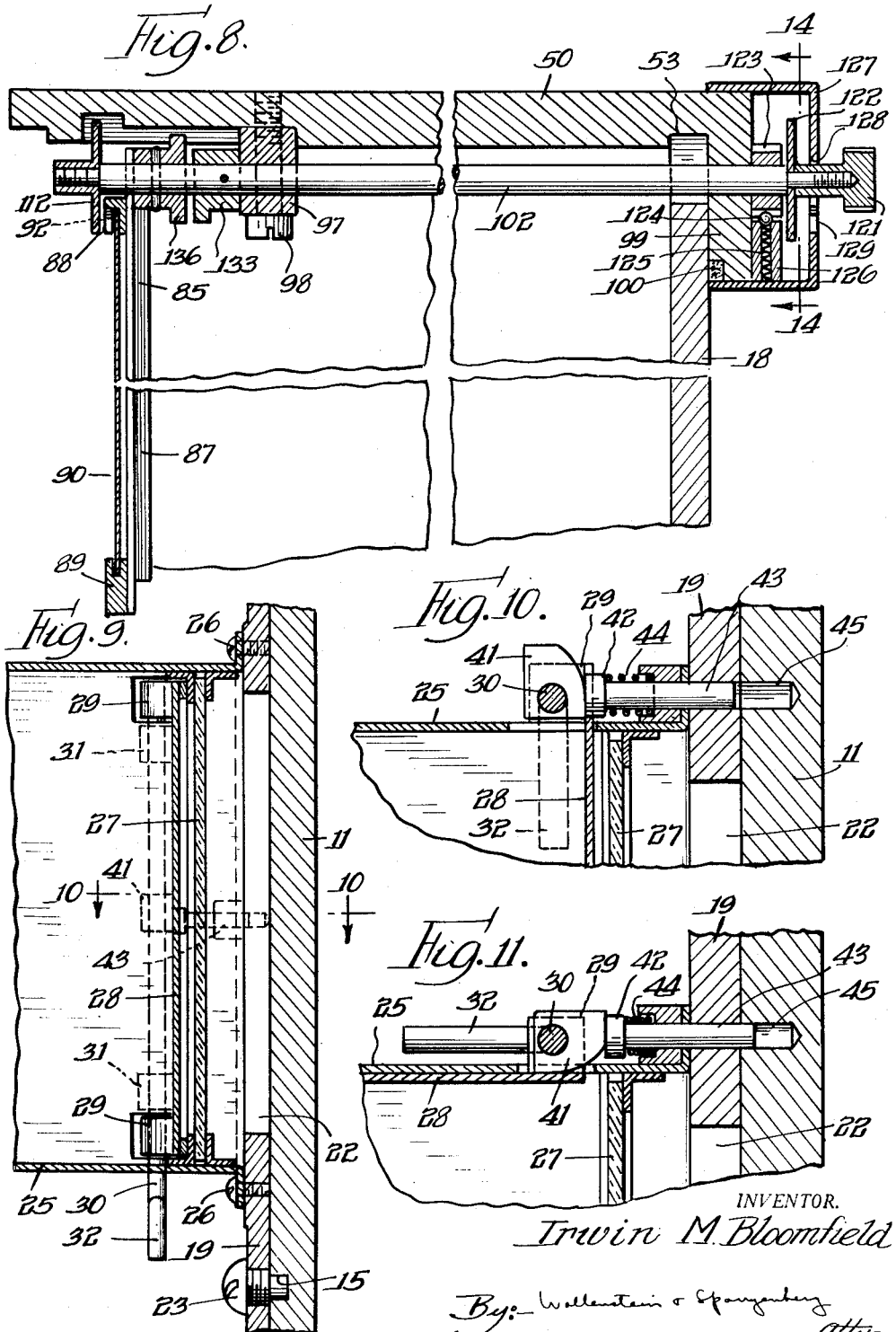

July 5, 1960　　I. M. BLOOMFIELD　　2,943,542
ROLL FILM ADAPTER

Filed May 14, 1956　　5 Sheets-Sheet 5

INVENTOR.
Irwin M. Bloomfield
By: Wallenstein & Spangenberg
Attys

United States Patent Office 2,943,542
Patented July 5, 1960

2,943,542

ROLL FILM ADAPTER

Irwin M. Bloomfield, 6210 N. Sacramento Ave., Chicago, Ill.

Filed May 14, 1956, Ser. No. 584,529

8 Claims. (Cl. 95—1.1)

View cameras, such as generally used for portrait work, normally utilize photographic plates which are relatively expensive in initial cost and which are relatively expensive to develop since they must be individually processed. Where low volume production is present, these relatively high costs are not too burdensome, but where large volume production is encountered, as in the case of a studio employing large numbers of photographers, these relatively high costs become almost insurmountable.

The principal object of this invention is to provide a roll film adapter for view cameras whereby roll film may be utilized in lieu of photographic plates thereby greatly decreasing initial costs and, more important, greatly reducing developing costs since mass developing techniques of roll films may be utilized rather than the individual treatment required for plates. Further objects of this invention are to produce a roll film adapter for a view camera wherein viewing or focusing on one hand and photographing on the other hand may be rapidly and conveniently accomplished, wherein accidental exposure of the film is prevented, wherein photographs commensurate with plate produced photographs are obtained, wherein the roll film is at all times tensioned for optimum photographic results, wherein the film is automatically indexed to correct position for each exposure, and wherein each exposure is automatically photographically coded along the normally unexposed margin thereof. This latter feature is particularly useful in large scale production such as described above.

Briefly, the roll film adapter of this invention includes a back plate which is secured to the rear of the view camera, the back plate having a view opening therein in alignment with the camera lens. The back plate extends laterally beyond the sides of the camera A roll film magazine having a lateral extension is slidably mounted on the back plate by means of guide tracks. The magazine has an opening communicating with the view opening in the back plate when the magazine and its lateral extension are slid to one position for picture taking or exposure purposes, and the lateral extension of the magazine has an opening communicating with the view opening in the back plate when the magazine and its lateral extension are slid to another position for focusing or viewing purposes A focusing glass is arranged over the opening in the extension of the magazine and a light shield is arranged about the focusing glass for shielding direct light therefrom to aid in focusing. Means, such as a slot and pin, are provided for limiting the sliding movement of the magazine and its lateral extension between said picture taking position and said focusing position A door is pivotally mounted in the light shield, which is opened only during viewing or focusing, and which is closed during picture taking and during shifting from focusing position to picture taking position and vice versa The purpose of the door is to prevent accidental exposure of the film Neans are provided for preventing shifting of the magazine and its extension from the viewing position if the door is opened and these means also prevent the door from being opened unless the magazine and its extension are in viewing or focusing position.

A film guide is arranged in the film magazine housing adjacent the exposure opening therein and it is provided with spaced apart and facing channel guides for receiving and guiding the edges of the film Means are provided for feeding the film through the film guide and preferably this means includes a film supply spool, a film take up spool, and a guide roll adjacent each end of the film guide, the film extending from the film supply spool, over one guide roll, through the film guide, and over the second guide roll, to the film take up spool Means are provided for tensioning the film and preferably this means includes a pair of pressure rolls carried by a spring pressed whiffle tree so as to provide uniform tension to the film The film take up spool is rotated for advancing the film and the means for rotating the film take up spool includes a one way clutch type brake which prevents reverse rotation of the film take up spool This one way clutch type brake co-operates with the film tensioning means for at all times maintaining the film under tension in the magazine One of the guide rolls, the one between the film supply spool and the film guide, and the one which is associated with the tensioning means, is provided with a releasable locking means so as to limit the extent of advance of the film for each exposure One of the channel guides of the film guide has a plurality of notches therein for exposing the film in that channel guide at said notches, and a plurality of transparent discs having opaque indicia thereon, are located between the respective notches in the channel guide and the exposure opening in the magazine housing for photographically applying the indicia to the edge of the film Means are provided for adjustably positioning the transparent discs for aligning selected indicia thereon with the notches in the channel guide for photographically applying the selected indicia to the edge of the film. Some of these discs are manually positioned and others are automatically positioned by the releasable locking means which controls the advance of the film. These latter discs so automatically operated, are utilized for automatically numbering the exposures. The other discs, which are manually adjusted, may be utilized for coding the photographer utilizing the particular camera and the day, month, and year, when the exposure is taken. This information, so photographically applied to the normally unexposed margin of the film, is of great assistance in properly identifying the exposures on the roll film as they are developed by mass production techniques.

Other objects and advantages of this invention reside in the details of construction of the roll film adapter and in the co-operative relationships between the component parts thereof.

Other objects and advantages of this invention will become apparent to those skilled in the art upon reference to the accompanying specification, claims and drawings, in which:

Fig. 3 is an elevational view of the side plate of the film magazine showing the parts carried thereby within the magazine and also showing the magazine slidably mounted on the back plate.

Fig. 4 is a perspective view of the film tensioning means illustrated in the lower portion of Fig. 3.

Fig. 5 is a vertical sectional view taken substantially along the line 5—5 of Fig. 3.

Fig. 6 is a partial view similar to the lower portion of Fig. 5, but showing the parts in a different position.

Fig. 7 is a perspective view of the releasable locking means illustrated in the lower portions of Figs. 5 and 6.

Fig. 8 is a horizontal sectional view taken substantially along the line 8—8 of Fig. 3.

Fig. 9 is a vertical sectional view taken substantially along the line 9—9 of Fig. 5.

Fig. 10 is a horizontal sectional view taken substantially along the line 10—10 of Fig. 9.

Fig. 11 is a sectional view similar to Fig. 10, but illustrating the door in open position.

Figure 1:
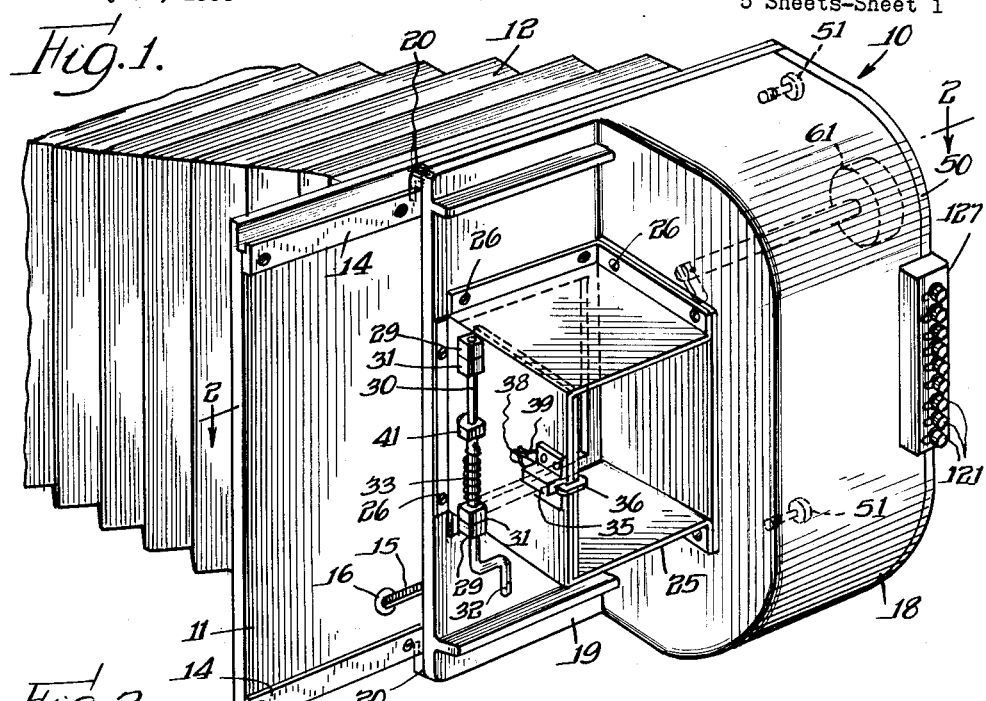
Fig. 1 is a perspective view of the roll film adapter of this invention as applied to a view camera.
Figure 2:
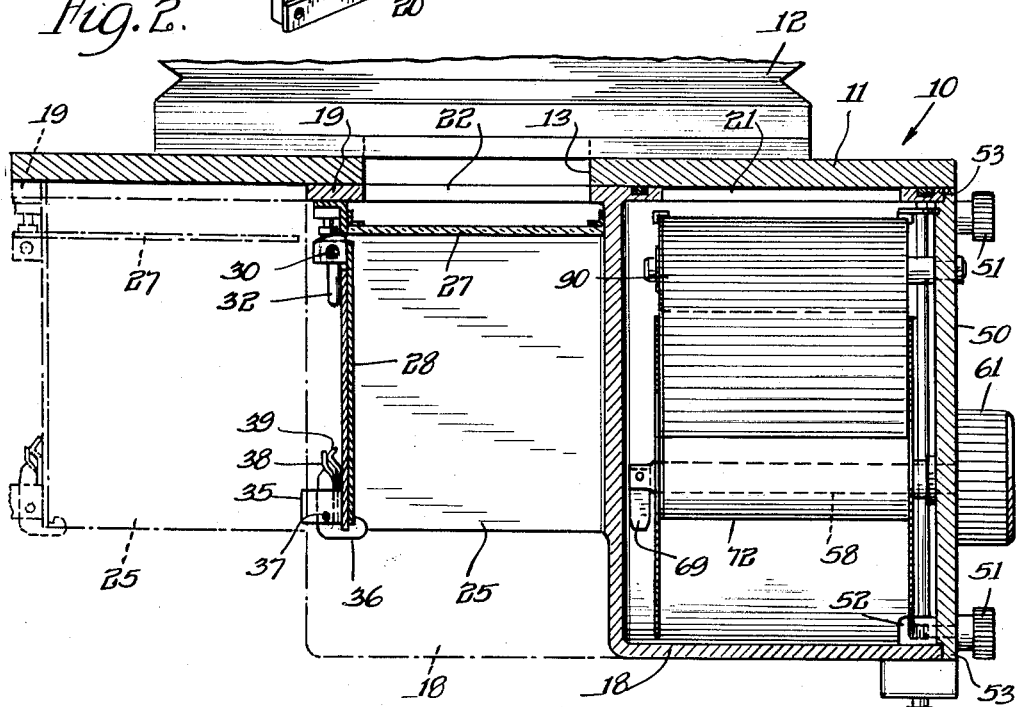
Fig. 2 is a horizontal sectional view taken substantially along the line 2—2 of Fig. 1.

Referring first to Figs. 1, 2, 5, 9, 10, and 11, and more particularly to Figs. 1 and 2, the roll film adapter of this invention is generally designated at 10. It includes a back plate 11 which is secured to the back of a view camera at the rear of the bellows 12 thereof, the front of the bellows 12 terminating in the usual lens assembly. The back plate 11 has a view opening 13 therein communicating with the interior of the bellows 12. The back plate 11 also extends laterally beyond the sides of the camera. Adjacent its top and bottom, the back plate 11 is provided throughout its length with a pair of guide tracks 14. Below the view opening 13, the back plate 11 is also provided with a horizontal groove or slot 15, and since the back plate is preferably formed of a lightweight relatively soft material, such as aluminum or the like, the ends of the groove or slot 15 terminate in relatively hard metal inserts 16 arranged in the back plate, these inserts being preferably formed of steel or the like. The guide tracks 14 are also preferably made of a hard material such as steel or the like.

A roll film magazine 18 having a lateral extension 19 is arranged against the back plate 11 and the magazine and its extension are provided with a pair of guide tracks 20 which engage over and slidably contact the guide tracks 14 on the back plate. In this way, the magazine and its extension are slidably mounted on the back plate for movement from one end thereof to the other. Here, the magazine and its extension are also preferably formed of lightweight metal such as aluminum or the like, and the guide tracks 20 are preferably formed of a hard metal such as steel or the like. The roll film magazine is provided with an exposure opening 21 which coincides with the view opening 13 in the back plate 11 when the magazine and its extension are moved to the left, as illustrated in broken lines in Fig. 2. Likewise, the extension 19 of the magazine is provided with a viewing or focusing opening 22 which aligns with the view opening 13 in the back plate 11 when the magazine and its extension are moved to the extreme righthand position, as shown in full lines in Figs. 1 and 2. A pin 23, as more clearly shown in Fig. 9, is carried by the extension 19 and is received within the horizontal slot or groove 15 for limiting sliding movement of the magazine and its extension, to the two extreme positions illustrated.

A light shield 25 is secured by screws 26 to the magazine 18 and its extension 19 and it is arranged about the viewing or focusing opening 22 in the extension 19 for shielding against direct light. A focusing glass 27 of conventional construction is mounted in the shield 25 adjacent the focusing opening 22 in the extension 19 so that the image produced by the camera lens assembly, when properly focused, appears thereon when the magazine 18 and extension 19 are moved to the extreme right position, as illustrated in Figs. 1 and 2. The light shield 25 operates to prevent direct light from falling on the focusing glass so as to aid in the focusing of the view camera.

A door 28 is pivotally mounted in the light shield 25 and toward this end the door is provided with a pair of extensions which extend through openings in the light shield 25 and which are secured to blocks 29 which are, in turn, secured to a vertical shaft 30. This shaft 30 is rotatably mounted in bearing blocks 31 secured to the outside of the shield 25, the shaft 30 being provided with a crank arm 32 for opening and closing the door. A spring 33 having one end secured to the shaft 30 and the other end secured to one of the bearing blocks 31, operates normally to close the door 27. A bracket 35 is secured to the outside of the light shield 25 and a latch 36 is pivoted to the bracket at 37, the latch 36 having a manipulating finger 38 which is engaged by a spring 39 for normally maintaining the latch in latching position. When the crank 32 is manipulated against the action of the spring 33, to open the door 28, the door is latched open by the latch 36. When it is desired to close the door, the latch 36 is operated against the spring 39 by the manipulating finger 38 to release the door 28 and when this occurs, the spring 33 closes the door to prevent light from passing through the focusing plate 27 and the viewing or focusing opening 22 in the extension 19.

Intermediate its ends, the shaft 30 has secured to it a cam 41 which engages the head 42 of a pin 43 which, in turn, is slidably mounted in the extension 19 and a bearing support carried by the light shield 25, as illustrated more clearly in Figs. 10 and 11. A spring 44 engages the head 42 of the pin 43 for maintaining the head 42 against the cam 41 and for normally maintaining the pin 43 in retracted position. The back plate 11 is provided with a hole 45 which is in alignment with the pin 43 when the magazine 18 and its extension 19 are moved to the extreme right hand or viewing or focusing position, as illustrated in Figs. 1 and 2. In this position, the door may be opened, since the pin 43 is then allowed to enter the hole 45 as shown in Fig. 11, when it is forced inwardly by the cam 41 on the shaft 30. If the magazine 18 and its extension 19 are in any other position, then the pin 43 cannot be forced inwardly and the door 28 cannot be opened. Likewise when the magazine 18 and its extension 19 are in the end focusing position with the door 28 open, and with the pin 43 received in the hole 45, the magazine and its extension cannot be moved out of this position until the door 28 is closed. There is, therefore, provided a double safeguard means which prevents sliding of the magazine 18 and its extension 19 out of the viewing or focusing position while the door 28 is open and which prevents opening of the door 28 while the magazine 18 and its extension 19 are in any position but the end focusing position. Thus, it is impossible to pass light from the light shield 25 through the focusing opening 22 in the extension 19. The viewing opening 13 in the back plate 11, and the exposure opening 21 in the magazine 18. Accidental exposure of the film in the magazine 18 is thereby prevented.

Figure 12:
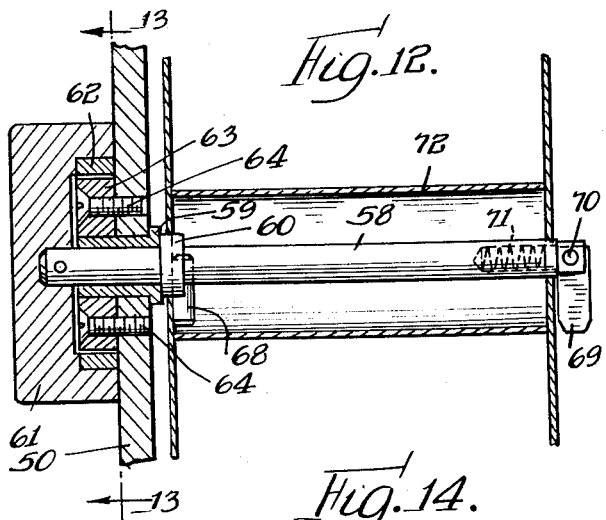
Fig. 12 is a sectional view through the driving means for the film take up spool and taken substantially along the line 12—12 of Fig. 3.
Figure 13:
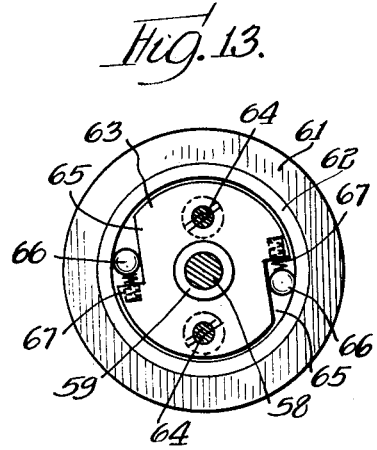
Fig. 13 is a sectional view taken substantially along the line 13—13 of Fig. 12.
Figure 14:
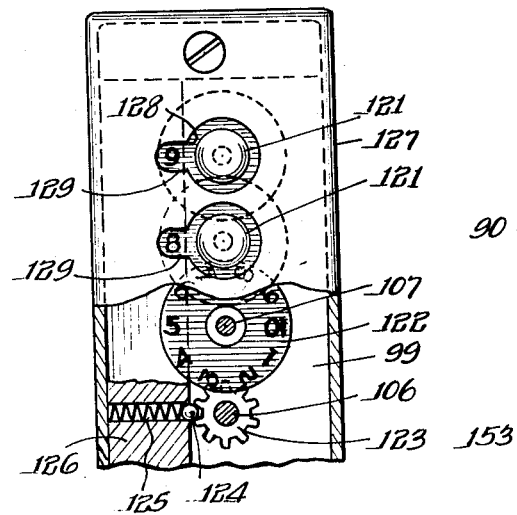
Fig. 14 is an irregular sectional view taken substantially along the line 14—14 of Fig. 3.

The roll film magazine 18 includes a housing portion which is closed at one side by a removable side plate 50, this side plate being held in place by thumb screws 51 received in bosses 52 in the housing portion. To assure proper positioning of the side plate 50 with the housing portion, the side plate 50 is provided with a shoulder 53 about its periphery, which seats within the housing position. As shown more clearly in Fig. 3, secured to the side plate 50 adjacent the bottom thereof, is a stud pin 55 upon which is rotatably mounted a film supply spool 56. Preferably, the side of the magazine housing, opposite to the removable end plate 50, is provided with a leaf spring which engages the inner side of the film supply spool 56 so as to frictionally brake the same against rotation. As shown more particularly in Figs. 3, 12, and 13, a shaft 58 is rotatably mounted in a bearing 59 secured in the housing side plate 50, this shaft 58 being held against longitudinal displacement by a flange 60 and a knob 61. The knob 61 is hollowed out and is provided with an internal ring 62. A substantially circular plate 63 is arranged within the ring 62 and is secured to the outside of the end plate 50 by screws 64. This plate 63 is provided with a pair of notches 65 in each of which are located a ball 66, which is spring pressed outwardly by a spring 67. The spring pressed balls 66 co-operate with the internal ring 62 of the knob 61 for providing a one-way clutch-type of brake which permits rotation of the knob 61 in a clockwise direction, as illustrated in Fig. 13, but which prevents rotation of the knob in the opposite direction. Thus, it is only possible to rotate the shaft 58 in one direction, which is the feeding direction for the roll film, it being impossible for the film to move in the opposite direction. The shaft 58 carries a pin 68 which is received in a suitable notch in a film take-up spool 72 so that as the shaft 58 is rotated, the film take-up roll 72 is correspondingly rotated. A locking lever 69 is pivoted to the end of the shaft 58 as indicated at 70, and it is held in a locking position, as illustrated in Fig. 12, or in an extended position by a spring 71, arranged in the shaft 58. When the lever 69 is extended, the take-up spool 72 may be slid onto the shaft 58 and when it is so received on the shaft 58, it is locked in position by manipulating the locking lever 69 to the position illustrated in Fig. 12.

As shown more particularly in Figs. 3 and 5, a stud pin 75 is secured to the side plate 50 adjacent the bottom thereof and a guide roll is rotatably mounted thereon, the guide roll having a bearing portion 76 and a resilient sleeve 77 formed of rubber or the like. The bearing portion 76 carries a pin 78 at one end thereof, this pin forming a portion of a releasable locking means to be explained hereafter. Another stud pin 80 is secured to the side plate 50 adjacent the top thereof and another guide roll is rotatably mounted on this stud pin, this guide roll also including a bearing portion 81 and a resilient sleeve portion 82 formed from rubber or the like.

The two guide rolls rotatably mounted on the pins 75 and 80, operate to guide the roll film through a film guide 85 which is positioned adjacent the exposure opening 21 in the magazine 18. The film guide 85 is secured in place on the side plate 50 by means of brackets 86 at each end thereof. The film guide 85 also includes a pair of transverse arms 87 which connect together a pair of spaced apart and facing channel guides 88 and 89. The roll film 90 extends from the film supply spool 56 over the first guide roll 77 through the film guide 85 and over the second guide roll 82 to the film take-up spool 72. In this connection, the edges of the roll film 90 are received in and guided by the channel guides 88 and 89, thereby accurately positioning the roll film 90 adjacent the exposure opening 21 in the film magazine 18.

One of the channel guides, namely, the channel guide 88, is provided with a plurality of notches 92 for the purpose of exposing the normally unexposed marginal edge of the film at the notches. These notches, therefore, form part of a coding means to assist in indentifying the exposure. The other channel guide 89 has a leaf spring 93 secured thereto by a bracket 94, the ends of the leaf spring 93 extending through notches 95 in the outer edge of the channel guide 89 for engaging the edge of the roll film 90 for resiliently biasing the same toward the channel guide 88. This leaf spring 93, therefore, operates to at all times maintain the edge of the roll film 90 deep within the channel guide 88.

A bearing block 97 is secured by screws 98 to the inside of the side plate 50 adjacent the film guide 85. The rear side of the side plate 50 is provided with a bracket portion 99 overlying the rear wall of the magazine housing 18 and this bracket portion 99 also forms a bearing block. This bearing block may be sealed against the housing 18 by a suitable felt gasket 100 to prevent light from entering the magazine housing. A plurality of shafts 101 to 109 are rotatably mounted in the bearing blocks 97 and 99 and they extend forwardly along one side of the film guide 85. These shafts 101 to 109, respectively, carry transparent discs 111 to 119, respectively, each transparent disc being located between the channel guide 88 and the exposure opening 21 and each being associated with a notch 92 in the channel guide 88. These discs 111 to 119 carry desired opaque indicia such as numerals, which numerals may be selectively aligned with the notches 92 in the channel guide 88. Thus, when the film is exposed during the taking of a picture, the indicia on the transparent discs 111 to 119 are photographically applied to the normally unexposed edge of the roll film 90. The shafts 101 to 109 and the associated transparent discs 111 to 119, may be manually rotated by knobs 121 secured to the outer ends of the shafts. Carried by each shaft adjacent the knob 121, is a dial 122 having indicia thereon corresponding to the indicia on the transparent discs 111 to 119, respectively, the dials 122 thereby indicating the positions of the transparent discs and hence the information to be photographically produced on the film. To assure proper alignment of the indicia on the transparent discs with respect to the notches 92 in the channel guide 88, each shaft 101 to 109 is provided with a detent member 123 having a plurality of teeth thereon which are engaged by a ball 124 which is pressed by a spring 125 against the teeth on the member 123. The balls 124 and springs 125 are guided in a suitable block 126 carried by the bearing block 99. The spring pressed balls 124 co-operate with the toothed members 123 for accurately positioning the transparent discs 111 to 119 and the dials 122. A cover 127 is arranged over the dials 122 and it is provided with a plurality of openings 128 for receiving the knobs 121. The openings 128 are provided with notches 129 for exposing the indicia on the dials 122 so that the rotative positions of the dials 122 and the associated transparent discs may be readily ascertained.

The shafts 104 to 109 are held against longitudinal displacement by the detent members 123 and by collars 131 secured to the shafts and engaging the bearing block 97. These shafts 104 to 109 are normally manually adjusted by the knobs 121 for coding information on the film, for example, the transparent discs 114 and 115 indicating the number of the photographer utilizing the camera, and the discs 116, 117, 118, and 119, indicating the day, month, and year at which a particular exposure is made. The shafts 103, 102, and 101, are held against longitudinal displacement, respectively, by a ten-tooth gear 132, a one-tooth gear 133, and a ten-tooth gear 134. The shaft 101 also carries a one-tooth gear 135 which is adapted to engage a ten-tooth gear 136 carried by the shaft 102. These various gears, therefore, form a counting mechanism, each complete revolution of the shaft 101 causing the shaft 102 to rotate one-tenth of a revolution and each complete revolution of the shaft 102 causing the shaft 103 to make one-tenth of a revolution. As will be pointed out hereafter, each time that a picture is taken, the shaft 101 is rotated one-tenth of a revolution, and, therefore, the transparent discs 111, 112, and 113, operate automatically to consecutively indicate photographically on the roll film the numbers of the pictures taken.

The side plate 50 carries a pair of inwardly extending pins 138 and 139 and a locking lever 140 provided with slots 141 receiving the pins 138 and 139 is slidably mounted on the inside of the side plate 50. Adjacent the pin 138, the side plate 50 is recessed to provide a shoulder 142 about which the locking lever 140 may pivot, as shown more clearly in Figs. 5 and 6. One end of the locking lever 140 is provided with a pin 143 which is adapted to engage the teeth on the gear 134 carried by the shaft 101. The other end of the locking lever 140 is provided with a surface 144 which is adapted to be engaged by the pin 78 on the guide roll 76 and is further provided with a stop projection 145 which is adapted to be engaged by the same pin. A spring 146 carried by the pin 139 is interposed between the locking lever 140 and a collar 147 carried by the pin 139 and the function of this spring 146 is to normally maintain the locking lever 140 flat against the side plate 50 as shown in Fig. 5. Another spring 148 is connected between the stationary pin 139 and the pin 143 which engages the gear 134, this spring 148 operating normally to move the locking lever 140 downwardly toward the shaft 75 of the guide roll 77. A pin 150 is slidably mounted in the side plate 50, the inner end of the pin engaging the locking lever 140 and the outer end of the pin being provided with a button 151.

A stationary L-shaped bracket 157 is pivotally mounted on the side plate 50 by a pivot pin 158 and this bracket 157 carries a pivot pin 159 which pivotally mounts a shaft 160 at a point intermediate the ends thereof. A pair of rollers 161 are rotatably mounted on the shaft 150, these rollers preferably having a rubberlike surface. A spring 162 interposed between the lever 157 and the side plate 50 operates to press the pair of rollers 161 against the film 90 where the film traverses the first guide roll 77. Because the shaft 150 carrying the rollers 161 is pivotally mounted between the rollers to the bracket 157, the shaft 160 and pivotal mounting 159 operate as a whiffle tree so that both rollers 161 are pressed against the film 90 on the guide roll 77 by the spring 162 with equal force. In this way, uniform tension is applied to the film 90 at the guide roll 77.

With the locking lever 140 in the position illustrated in Fig. 5, wherein the pin 78 on the guide roll 77 is engaging the projection 145 on the locking lever 140, the film 90 is locked against advancement. In order to advance the film, the button 151 is pressed, which tilts the locking lever 140 about the fulcrum shoulder 142 as indicated in Fig. 6 and when this occurs, the pin 78 on the first guide roll 77 is released and the spring 148 operates to slide the locking lever 140 downwardly beyond the pin 78 an amount permitted by the slots 141 in the locking lever 140. The guide roll 77 is, therefore, free to be rotated. The knob 61 is then turned to advance the film 90. As the film is so advanced, the guide roll 77 turns and tension is applied to the film by the pair of rollers 161. After the pin 78 on the guide roll 77 rides out from under the locking lever 140, the spring 146 returns the locking lever 140 flat against the side plate 50 and the pin 143 engages a tooth on the gear 134. As the advance of the film continues, the pin 78 on the guide roll 77 engages the surface 144 on the locking lever 140 to slide the same upwardly and during this upward sliding movement of the lever 140 the pin 143 advances the gear 134 one-tenth of a revolution. When the pin 78 engagegs the stop projection 145 on the locking lever 140, further rotation of the guide roll 77 is prevented and hence further advancing of the film 90 is prevented. The parts are now in a position for a repeat operation of the above-described operating cycle. In this way, the film is advanced a predetermined amount and each time that the film is advanced, the transparent disc 111 is advanced for the purpose of recording the number of the exposure. As expressed above, the transparent discs 112 and 113 are also advanced, respectively, as the discs 111 and 112 are rotated through a complete revolution. It is, therefore, possible to photographically record on the film 90 up to 999 exposures.

Figure 16:
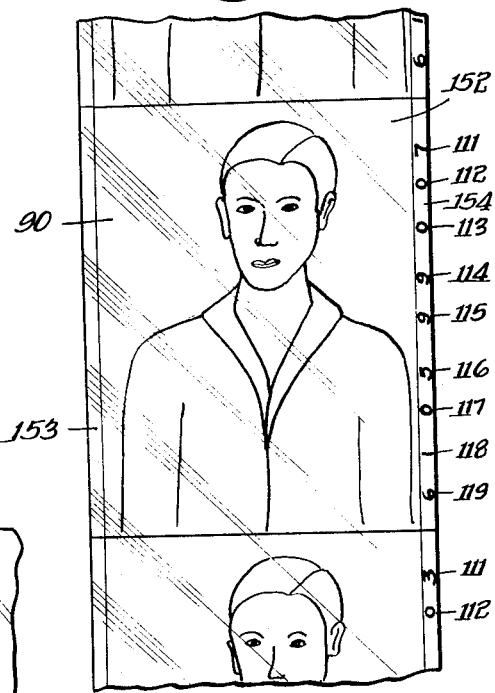
Fig. 16 is a plan view of a section of the photographic film which has been exposed in the film adapter magazine of this invention and after it has been developed.
Figure 15:
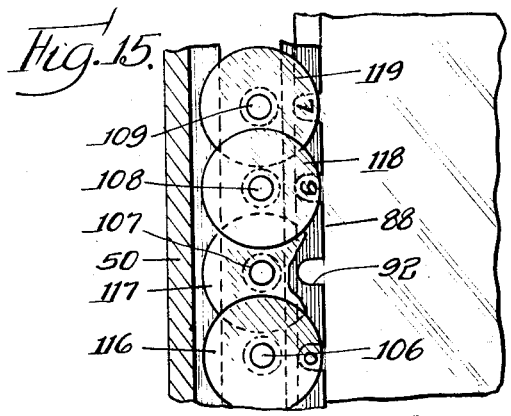
Fig. 15 is a sectional view taken substantially along the line 15—15 of Fig. 3.

Referring to Fig. 16, a developed section of the film 90 is illustrated. Here, the portion 152 indicates the picture taken of the subject and the edges of the film are provided with normally unexposed portions 153 and 154. However, the unexposed portion 154 carries a coding brought about by the indicia on the transparent discs 111 to 119, the indicia 111 to 113 showing the number of the exposure or picture, the indicia 114 and 115 showing the number of the photographer utilizing the camera, the indicia 116 and 117 showing the day, indicia 118 showing the month, and the indicia 119 showing the year. These indicia on the normally unexposed margin of the film operate to code the particular exposure which, of course, is of great assistance in processing and developing the roll film on a mass production basis.

The various elements and features of this invention all structurally and functionally co-operate with each other for providing a roll film adapter for a view camera which produces new, useful and unexpected results. The roll film adapter provides for rapidly and conveniently accomplished viewing or focusing on one hand and photographing on the other, eliminates accidental exposure of the film while changing from focusing to photographing and vice versa, maintains the roll film under tension at all times for obtaining optimum photographic results, automatically indexes the film to correct position for each exposure and automatically photographically codes each exposure of the film along the normally unexposed margin thereof to assist in the mass production development of the roll film which is made possible by the roll film adapters of this invention.

While for purposes of illustration, one form of this invention has been disclosed, other forms thereof may become apparent to those skilled in the art upon reference to this disclosure and, therefore, this invention should be limited only by the scope of the appended claims.

I claim as my invention:

1. In a roll film adapter for a camera, a film magazine housing having an exposure opening therein, a film guide in the housing adjacent the exposure opening and consisting of spaced apart and facing channel guides for receiving and engaging and guiding the edges of the film against sidewise movement, means for feeding the film through the film guide, one of said channel guides having a plurality of notches therein for exposing the film in that channel guide at said notches, a plurality of transparent discs having opaque indicia thereon located outside of the film guide between the respective notches in said one channel guide and the exposure opening for photographically applying the indicia to the edge of the film, and means for adjustably positioning the transparent disc for aligning selected indicia thereon with the notches in said one channel guide.

2. In a roll film adapter for a camera, a film magazine housing having an exposure opening therein, a film guide in the housing adjacent the exposure opening and consisting of spaced apart and facing channel guides for receiving and engaging and guiding the edges of the film against sidewise movement, means for feeding the film through the film guide, one of said channel guides having a plurality of notches therein for exposing the film in that channel guide at said notches, a plurality of transparent discs having opaque indicia thereon located outside of the film guide between the respective notches in said one channel guide and the exposure opening for photographically applying the indicia to the edge of the film, means for adjustably positioning the transparent discs for aligning selected indicia thereon with the notches in said one channel guide, and spring means received in the other channel guide and engaging the edge of the film therein for assuring deep seating of the other edge of the film in said one channel guide.

3. In a roll film adapter for a camera, a film magazine housing having an exposure opening therein, a film guide in the housing adjacent the exposure opening and having spaced apart and facing channel guides for receiving and guiding the edges of the film, means for feeding the film through the film guide and including releasable locking means for limiting the advance of the film to a predetermined amount upon each actuation of the releasable locking means, one of said channel guides having a plurality of notches therein for exposing the film in that channel guide at said notches, a plurality of transparent discs having opaque indicia thereon located between the respective notches in said one channel guide and the exposure opening for photographically applying the indicia to the edge of the film, and means connected to the releasable locking means and operated upon each limited advance of the film for adjustably positioning at least some of the transparent discs for aligning different indicia thereon with the notches in said one channel guide.

4. In a roll film adapter for a camera, a film magazine housing having an exposure opening therein, a film guide in the housing adjacent the exposure opening and having spaced apart and facing channel guides for receiving and guiding the edges of the film, means for feeding the film through the film guide and including releasable locking means for limiting the advance of the film to a predetermined amount upon each actuation of the releasable locking means, one of said channel guides having a plurality of notches therein for exposing the film in that channel guide at said notches, a plurality of transparent discs having opaque indicia thereon located between the respective notches in said one channel guide and the exposure opening for photographically applying the indicia to the edge of the film, means connected to the releasable locking means and operated upon each limited advance of the film for adjustably positioning some of the transparent discs for aligning different indicia thereon with the notches in said one channel guide, and manually operated means for adjustably positioning the other transparent discs for aligning selected indicia thereon with the notches in said one channel guide.

5. In a roll film adapter for a camera, a film magazine housing having an exposure opening therein, a film guide in the housing adjacent the exposure opening and having spaced apart and facing channel guides for receiving and guiding the edges of the film, means for feeding the film through the film guide and including a film supply spool rotatably mounted in the housing, a film take up spool rotatably mounted in the housing, a first guide roll rotatably mounted in the housing adjacent one end of the film guide, and a second guide roll rotatably mounted in the housing adjacent the other end of the film guide, the film extending from the film supply spool, over the first guide roll, through the channel guides of the film guide, and over the second guide roll to the film take up roll, tensioning means cooperating with the first guide roll for tensioning the film, means for rotating the film take up spool for advancing the film against the tensioning force afforded by the tensioning means, releasable locking means for the first guide roll for limiting rotation thereof to one revolution for limiting advance of the film to a predetermined amount upon each actuation of the releasable locking means, one of said channel guides having a plurality of notches therein for exposing the film in that channel guide at said notches, a plurality of transparent discs having opaque indicia thereon located between the respective notches in said one channel guide and the exposure opening for photographically applying the indicia to the edge of the film, and means connected to the releasable locking means and operated upon each limited advance of the film for adjustably positioning at least some of the transparent discs for aligning different indicia thereon with the notches in said one channel guide.

6. In a roll film adapter for a camera, a film magazine housing having an exposure opening therein, a film guide in the housing adjacent the exposure opening and having spaced apart and facing channel guides for receiving and guiding the edges of the film, means for feeding the film through the film guide and including a film supply spool rotatably mounted in the housing, a film take up spool rotatably mounted in the housing, a first guide roll rotatably mounted in the housing adjacent one end of the film guide, and a second guide roll rotatably mounted in the housing adjacent the other end of the film guide, the film extending from the film supply spool, over the first guide roll, through the channel guides of the film guide, and over the second guide roll to the film take up roll, tensioning means cooperating with the first guide roll for tensioning the film, means for rotating the film take up spool for advancing the film against the tensioning force afforded by the tensioning means, releasable locking means for the first guide roll for limiting rotation thereof to one revolution for limiting advance of the film to a predetermined amount upon each actuation of the releasable locking means, one of said channel guides having a plurality of notches therein for exposing the film in that channel guide at said notches, a plurality of transparent discs having opaque indicia thereon located between the respective notches in said one channel guide and the exposure opening for photographically applying the indicia to the edge of the film, means connected to the releasable locking means and operated upon each limited advance of the film for adjustably positioning some of the transparent discs for aligning different indicia thereon with the notches in said one channel guide, and manually operated means for adjustably positioning the other transparent discs for aligning selected indicia thereon with the notches in said one channel guide.

7. In a roll film adapter for a camera, a film magazine housing having an exposure opening therein, a film guide in the housing adjacent the exposure opening and having spaced apart and facing channel guides for receiving and guiding the edges of the film, means for feeding the film through the film guide and including a film supply spool rotatably mounted in the housing, a film take up spool rotatably mounted in the housing, a first guide roll rotatably mounted in the housing adjacent one end of the film guide, and a second guide roll rotatably mounted in the housing adjacent the other end of the film guide, the film extending from the film supply spool, over the first guide roll, through the channel guides of the film guide, and over the second guide roll to the film take up roll, tensioning means cooperating with the first guide roll for tensioning the film and including a pair of pressure rolls rotatably carried by a shaft and engaging the film on the first guide roll, a movable bracket, means for pivotally mounting the shaft at a point between the pressure rolls to the bracket, and spring means acting on the bracket and through the pivotal mounting means for the shaft for pressing with uniform pressure the pressure rolls against the film on the first guide roll, means for rotating the film take up spool for advancing the film against the tensioning force afforded by the tensioning means, releasable locking means for the first guide roll for limiting rotation thereof to one revolution for limiting advance of the film to a predetermined amount upon each actuation of the releasable locking means, one of said channel guides having a plurality of notches therein for exposing the film in that channel guide at said notches, a plurality of transparent discs having opaque indicia thereon located between the respective notches in said one channel guide and the exposure opening for photographically applying the indicia to the edge of the film, and means connected to the releasable locking means and operated upon each limited advance of the film for adjustably positioning at least some of the transparent discs for aligning different indicia thereon with the notches in said one channel guide.

8. In a roll film adapter for a camera, a film magazine housing having an exposure opening therein, a film guide in the housing adjacent the exposure opening and having spaced apart and facing channel guides for receiving and guiding the edges of the film, means for feeding the film through the film guide and including a film supply spool rotatably mounted in the housing, a film take up spool rotatably mounted in the housing, a first guide roll rotatably mounted in the housing adjacent one end of the film guide, and a second guide rotatably mounted in the housing adjacent the other end of the film guide, the film extending from the film supply spool, over the first guide roll, through the channel guides of the film guide, and over the second guide roll to the film take up roll, tensioning means cooperating with the first guide roll for tensioning the film, means for rotating the film take up spool for advancing the film against the tensioning force afforded by the tensioning means and including means to prevent reverse rotation thereof for at all times maintaining tension in the film, releasable locking means for the first guide roll for limiting rotation thereof to one revolution for limiting advance of the film to a predetermined amount upon each actuation of the releasable locking means, one of said channel guides having a plurality of notches therein for exposing the film in that channel guide at said notches, a plurality of transparent discs having opaque indicia thereon located between the respective notches in said one channel guide and the exposure opening for photographically applying the indicia to the edge of the film, and means connected to the releasable locking means and operated upon each limited advance of the film for adjustably positioning at least some of the transparent discs for aligning different indicia thereon with the notches in said one channel guide.

References Cited in the file of this patent

UNITED STATES PATENTS

| | | |
|---|---|---|
| 518,372 | Mackenstein | Apr. 17, 1894 |
| 1,304,361 | Oehring | May 20, 1919 |
| 2,019,788 | Lloyd et al. | Nov. 5, 1935 |
| 2,075,670 | Soffel | Mar. 30, 1937 |
| 2,226,364 | Anthony | Dec. 24, 1940 |
| 2,374,486 | Howell | Apr. 24, 1945 |
| 2,543,353 | Champion | Feb. 27, 1951 |
| 2,726,586 | McCain | Dec. 13, 1955 |
| 2,813,469 | Nerwin | Nov. 19, 1957 |

FOREIGN PATENTS

| | | |
|---|---|---|
| 672,033 | Germany | Feb. 20, 1939 |
| 682,670 | Great Britain | Nov. 12, 1952 |